United States Patent
Patwardhan

(10) Patent No.: US 8,307,967 B2
(45) Date of Patent: Nov. 13, 2012

(54) WIDELY DEPLOYABLE CHARGING SYSTEM FOR VEHICLES

(76) Inventor: Satyajit Patwardhan, Fremont, CA (US)

( * ) Notice: Subject to any disclaimer, the term of this patent is extended or adjusted under 35 U.S.C. 154(b) by 343 days.

(21) Appl. No.: 12/168,137

(22) Filed: Jul. 6, 2008

(65) Prior Publication Data

US 2009/0011616 A1    Jan. 8, 2009

Related U.S. Application Data

(60) Provisional application No. 60/947,954, filed on Jul. 4, 2007.

(51) Int. Cl.
*B60L 1/00* (2006.01)
*H02J 7/00* (2006.01)

(52) U.S. Cl. .................... 191/2; 320/109

(58) Field of Classification Search ............ 191/2–4, 191/10, 14–19; 320/108, 109
See application file for complete search history.

(56) References Cited

U.S. PATENT DOCUMENTS

| | | |
|---|---|---|
| 3,603,860 A | 9/1971 | Johnson |
| 3,914,562 A * | 10/1975 | Bolger ............ 191/10 |
| 3,955,657 A | 5/1976 | Bossi |
| 3,986,095 A | 10/1976 | Nakai et al. |
| 4,012,681 A | 3/1977 | Finger et al. |
| 4,052,655 A | 10/1977 | Vizza |
| 4,109,193 A | 8/1978 | Schultheis |
| RE29,994 E | 5/1979 | Bossi |
| 4,158,802 A | 6/1979 | Rose, II |
| 4,184,580 A | 1/1980 | Ellis, Jr. |
| 4,274,043 A | 6/1981 | Heitz |
| 4,309,644 A | 1/1982 | Reimers et al. |
| 4,383,210 A | 5/1983 | Wilkinson |
| 4,413,219 A | 11/1983 | Ducharme et al. |
| 4,423,476 A | 12/1983 | Neumann |
| 4,450,400 A | 5/1984 | Gwyn |
| 4,496,896 A | 1/1985 | Melocik et al. |
| 4,532,418 A | 7/1985 | Meese et al. |
| 4,563,626 A | 1/1986 | Ohtake |
| 4,700,121 A | 10/1987 | Neri |
| 4,795,358 A | 1/1989 | Lyles |
| 4,850,879 A | 7/1989 | Langenbahn |
| 5,091,687 A | 2/1992 | Meyer et al. |
| 5,121,044 A | 6/1992 | Goldman |

(Continued)

*Primary Examiner* — S. Joseph Morano
*Assistant Examiner* — R. J. McCarry, Jr.
(74) *Attorney, Agent, or Firm* — Sunil K. Singh

(57) ABSTRACT

A mechanical, electrical and telecommunication system to electrically connect a vehicle to an electricity source to transfer energy to the vehicle is presented. In one rendition the system has a stationary portion on the road or infrastructure side, and a moving member on the vehicle. The system is designed to tolerate misalignments of a parked vehicle with respect to the parking stall. The infrastructure or road side component of the system being mechanically static is designed rugged and therefore is widely deployable. The system along with moving member is fail-safe and poses no threat to humans, the vehicle being charged or the vehicles sharing the road. An important component of the system is a pair of rigid, insulating strips with a series of conductors on each of them, placed at approximately right angles to each other. One of the strips is mounted on the infrastructure or road side and the other on the vehicle. The two strips cover the lateral and longitudinal misalignment of the parked vehicle. As long as the two strips have an overlap, the connection can be made by the conductors in the overlap region. The system is designed to operate only in the active presence and active desire of a vehicle to connect to the infrastructure or road side stationary part.

26 Claims, 15 Drawing Sheets

Actuating Mechanism.

U.S. PATENT DOCUMENTS

| | | |
|---|---|---|
| 5,184,058 A | 2/1993 | Hesse et al. |
| 5,187,423 A | 2/1993 | Marton |
| 5,202,617 A | 4/1993 | Nor |
| 5,252,078 A | 10/1993 | Langenbahn |
| 5,263,565 A | 11/1993 | Wilkinson |
| 5,264,776 A | 11/1993 | Hulsey |
| 5,272,431 A | 12/1993 | Nee |
| 5,297,664 A | 3/1994 | Tseng et al. |
| 5,298,849 A | 3/1994 | Drexel et al. |
| 5,306,999 A | 4/1994 | Hoffman |
| 5,311,973 A * | 5/1994 | Tseng et al. ............... 191/10 |
| 5,315,227 A | 5/1994 | Pierson et al. |
| 5,323,098 A | 6/1994 | Hamaguchi et al. |
| 5,323,099 A | 6/1994 | Bruni et al. |
| 5,327,066 A | 7/1994 | Smith |
| 5,341,083 A | 8/1994 | Klontz et al. |
| 5,341,280 A | 8/1994 | Divan et al. |
| 5,375,335 A | 12/1994 | Friton et al. |
| 5,413,493 A | 5/1995 | Hoffman |
| 5,422,624 A | 6/1995 | Smith |
| 5,449,995 A | 9/1995 | Kohchi |
| 5,461,298 A | 10/1995 | Lara et al. |
| 5,461,299 A | 10/1995 | Bruni |
| 5,462,439 A | 10/1995 | Keith |
| 5,463,303 A | 10/1995 | Hall et al. |
| 5,467,006 A | 11/1995 | Sims |
| 5,488,285 A | 1/1996 | Hosobuchi |
| 5,498,948 A | 3/1996 | Bruni et al. |
| 5,500,579 A | 3/1996 | Kim et al. |
| 5,504,414 A | 4/1996 | Kinoshita |
| 5,504,991 A | 4/1996 | Parmley, Sr. |
| 5,508,597 A | 4/1996 | Parmley, Sr. |
| 5,523,666 A | 6/1996 | Hoelzl et al. |
| 5,538,809 A | 7/1996 | Bittihn et al. |
| 5,545,967 A | 8/1996 | Osborne et al. |
| 5,548,200 A | 8/1996 | Nor et al. |
| 5,549,443 A | 8/1996 | Hammerslag |
| 5,563,491 A | 10/1996 | Tseng |
| 5,565,755 A | 10/1996 | Keith |
| 5,572,109 A | 11/1996 | Keith |
| 5,573,090 A | 11/1996 | Ross |
| 5,574,354 A | 11/1996 | Kohchi |
| 5,583,418 A | 12/1996 | Honda et al. |
| 5,594,317 A | 1/1997 | Yeow et al. |
| 5,594,318 A | 1/1997 | Nor et al. |
| 5,596,258 A | 1/1997 | Kimura et al. |
| 5,596,261 A | 1/1997 | Suyama |
| 5,598,083 A | 1/1997 | Gaskins |
| 5,598,084 A | 1/1997 | Keith |
| 5,600,222 A | 2/1997 | Hall et al. |
| 5,612,606 A | 3/1997 | Guimarin et al. |
| 5,614,808 A | 3/1997 | Konoya et al. |
| 5,617,003 A | 4/1997 | Odachi et al. |
| 5,627,448 A | 5/1997 | Okada et al. |
| 5,629,603 A | 5/1997 | Kinoshita |
| 5,637,977 A | 6/1997 | Saito et al. |
| 5,646,494 A | 7/1997 | Han |
| 5,646,500 A | 7/1997 | Wilson |
| 5,646,507 A | 7/1997 | Timmons et al. |
| 5,651,434 A | 7/1997 | Saunders |
| 5,654,621 A | 8/1997 | Seelig |
| 5,656,916 A | 8/1997 | Hotta |
| 5,661,391 A | 8/1997 | Ito et al. |
| 5,668,460 A | 9/1997 | Lashlee et al. |
| 5,669,470 A * | 9/1997 | Ross ............... 191/10 |
| 5,670,860 A | 9/1997 | Conrady et al. |
| 5,670,861 A | 9/1997 | Nor |
| 5,684,379 A | 11/1997 | Svedoff |
| 5,686,812 A | 11/1997 | Hotta |
| 5,696,367 A | 12/1997 | Keith |
| 5,703,461 A | 12/1997 | Minoshima et al. |
| 5,703,462 A | 12/1997 | Woody et al. |
| 5,710,502 A | 1/1998 | Poumey |
| 5,711,558 A | 1/1998 | Woody |
| 5,711,648 A | 1/1998 | Hammerslag |
| 5,714,864 A | 2/1998 | Rose et al. |
| 5,803,215 A | 9/1998 | Henze et al. |
| 5,819,187 A | 10/1998 | Sato et al. |
| 5,821,728 A * | 10/1998 | Schwind ............... 320/108 |
| 5,821,731 A * | 10/1998 | Kuki et al. ............... 320/108 |
| 5,847,537 A | 12/1998 | Parmley, Sr. |
| 5,850,135 A | 12/1998 | Kuki et al. |
| 5,903,134 A | 5/1999 | Takeuchi |
| 5,909,100 A | 6/1999 | Watanabe et al. |
| 5,926,004 A | 7/1999 | Henze |
| 5,927,938 A | 7/1999 | Hammerslag |
| 5,951,229 A | 9/1999 | Hammerslag |
| 5,982,139 A | 11/1999 | Parise |
| 5,998,963 A | 12/1999 | Aarseth |
| 6,014,597 A | 1/2000 | Kochanneck |
| 6,018,293 A | 1/2000 | Smith |
| 6,057,667 A | 5/2000 | Mills |
| 6,067,008 A | 5/2000 | Smith |
| 6,087,805 A | 7/2000 | Langston et al. |
| 6,087,806 A | 7/2000 | Fujioka |
| 6,094,028 A | 7/2000 | Gu et al. |
| 6,104,161 A | 8/2000 | Chung et al. |
| 6,114,833 A | 9/2000 | Langston et al. |
| 6,114,834 A | 9/2000 | Parise |
| 6,140,798 A | 10/2000 | Krieger |
| 6,154,005 A | 11/2000 | Hyogo et al. |
| 6,154,006 A | 11/2000 | Hatanaka et al. |
| 6,167,612 B1 | 1/2001 | Cunliffe |
| 6,185,501 B1 | 2/2001 | Smith et al. |
| 6,198,251 B1 | 3/2001 | Landon |
| 6,212,450 B1 | 4/2001 | Kokubu et al. |
| 6,225,776 B1 | 5/2001 | Chai |
| 6,307,347 B1 | 10/2001 | Ronning |
| 6,316,910 B1 | 11/2001 | Kajiura |
| 6,346,792 B1 | 2/2002 | Summerfield et al. |
| 6,362,594 B2 | 3/2002 | Kajiura |
| 6,371,230 B1 | 4/2002 | Ciarla et al. |
| 6,373,380 B1 | 4/2002 | Robertson et al. |
| 6,459,234 B2 | 10/2002 | Kajiura |
| 6,525,510 B1 | 2/2003 | Ayano et al. |
| 6,535,133 B2 | 3/2003 | Gohara |
| 6,573,686 B2 | 6/2003 | Uno |
| 6,614,204 B2 | 9/2003 | Pellegrino et al. |
| 6,674,265 B2 * | 1/2004 | Yoshida et al. ............... 320/125 |
| 6,727,809 B1 | 4/2004 | Smith |
| 6,792,259 B1 | 9/2004 | Parise |
| 6,819,081 B2 | 11/2004 | Izawa et al. |
| 6,822,422 B2 | 11/2004 | Sagawa |
| 6,833,683 B2 | 12/2004 | Winkler |
| 6,859,009 B2 | 2/2005 | Jablin |
| 6,859,010 B2 | 2/2005 | Jeon et al. |
| 6,879,889 B2 * | 4/2005 | Ross ............... 701/22 |
| 6,930,410 B2 | 8/2005 | Ikeda et al. |
| 6,940,254 B2 | 9/2005 | Nagamine et al. |
| 6,941,197 B1 | 9/2005 | Murakami et al. |
| 6,967,462 B1 | 11/2005 | Landis |
| 7,003,431 B2 | 2/2006 | Quint et al. |
| 7,004,710 B1 | 2/2006 | Quade |
| 7,023,177 B2 | 4/2006 | Bussinger |
| 7,068,991 B2 | 6/2006 | Parise |
| 7,117,799 B2 | 10/2006 | Davis et al. |
| 7,119,517 B2 | 10/2006 | Mikuriya et al. |

* cited by examiner

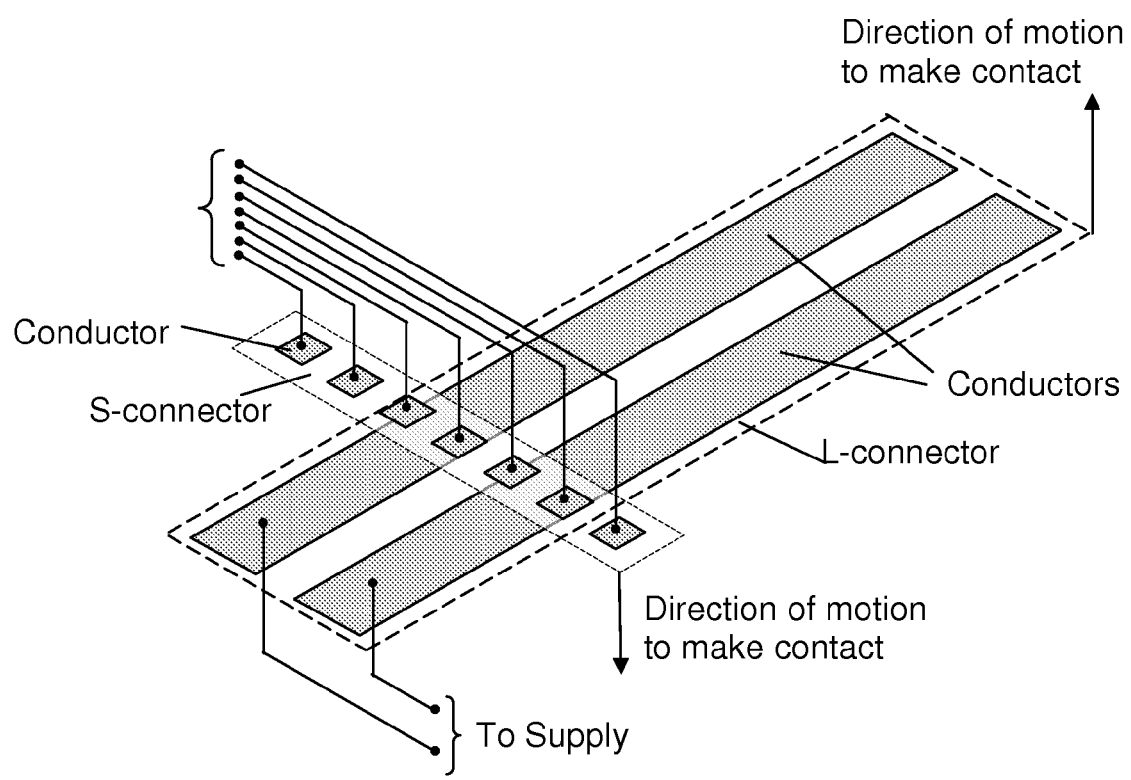
Figure 1: L and S connectors.

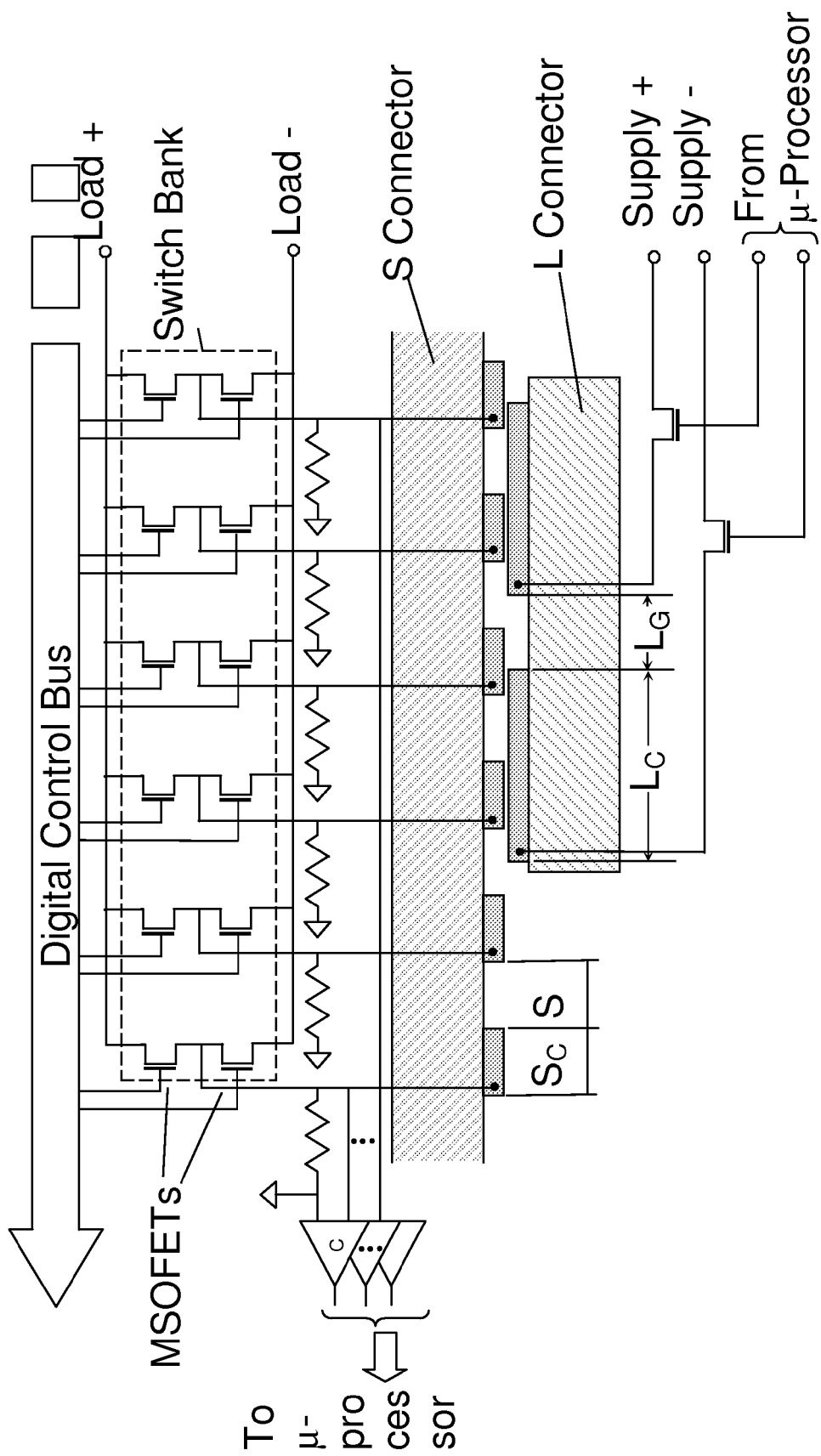
Figure 2: Electrical connections and geometry definition.

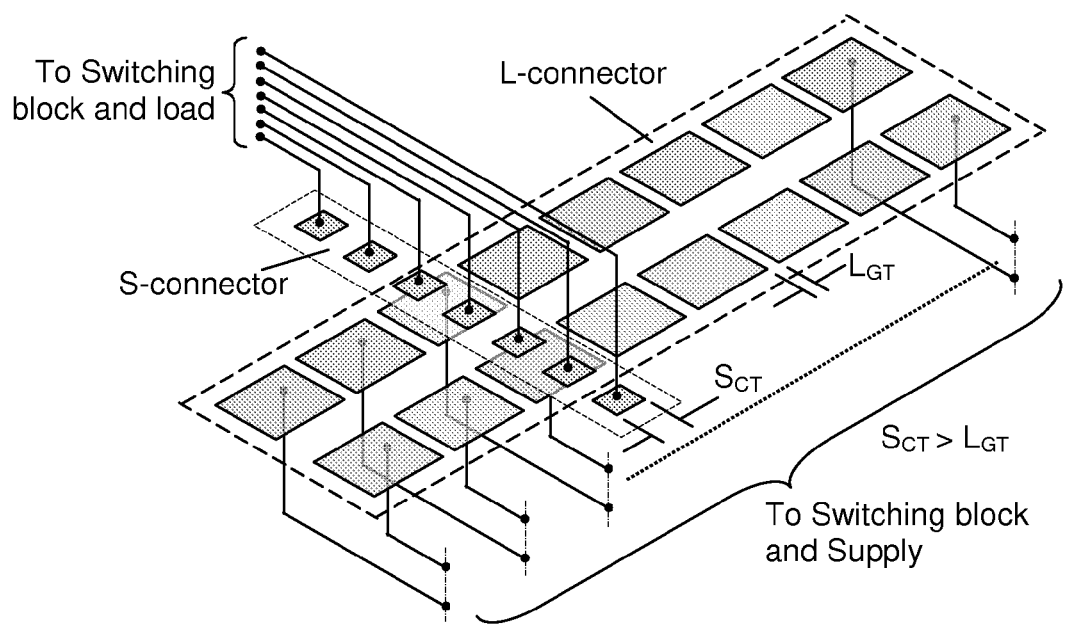
Figure 3: Splitting the L-connector conductors.
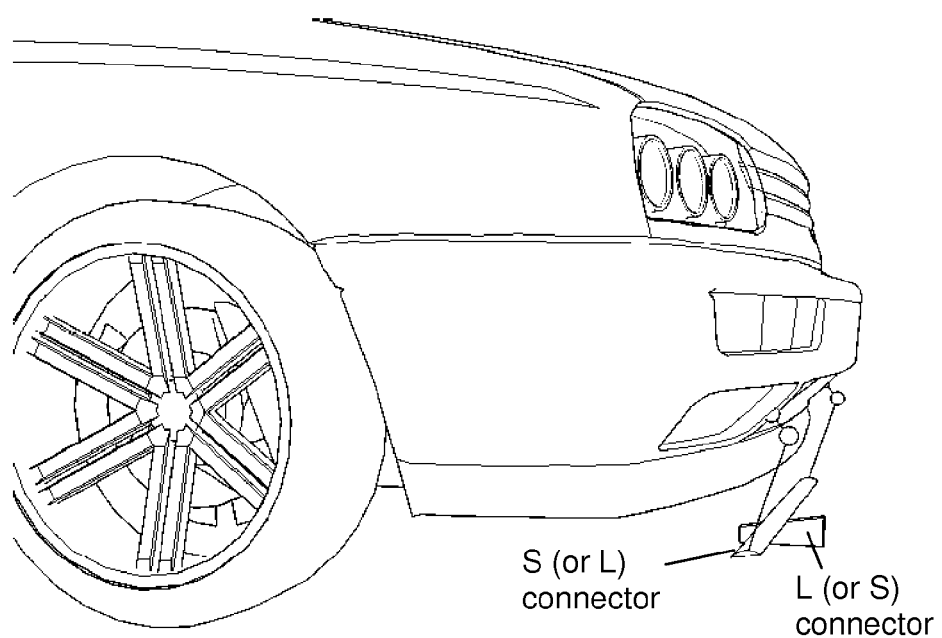
Figure 4: Front underside mounting.

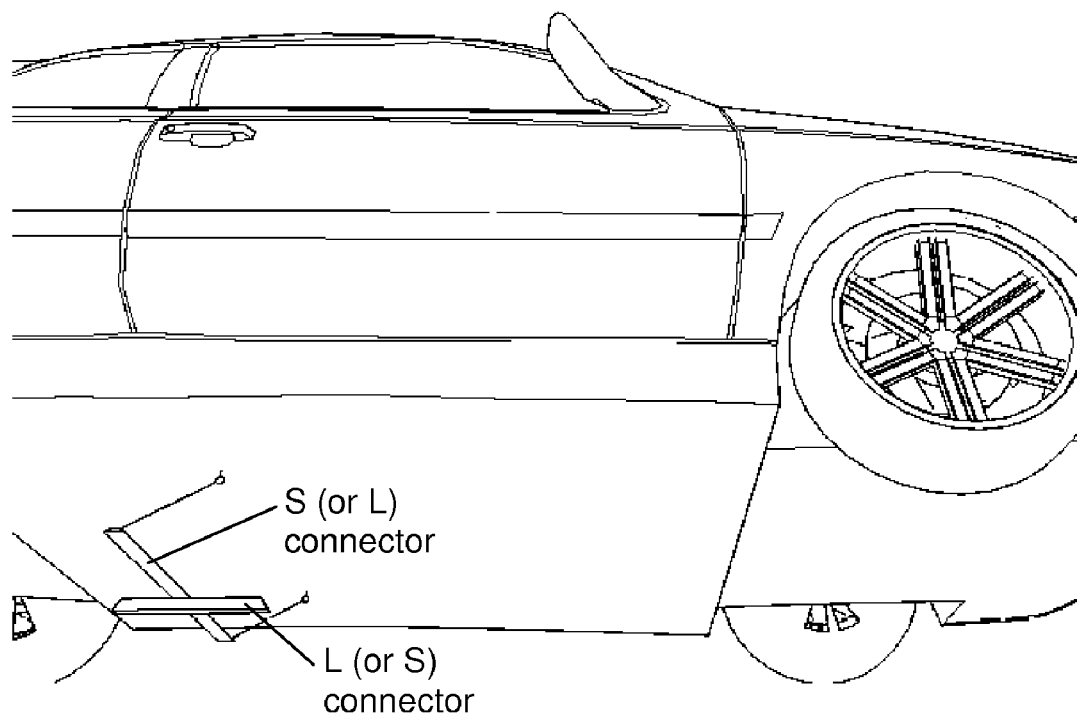
Figure 5: Underside mounting.

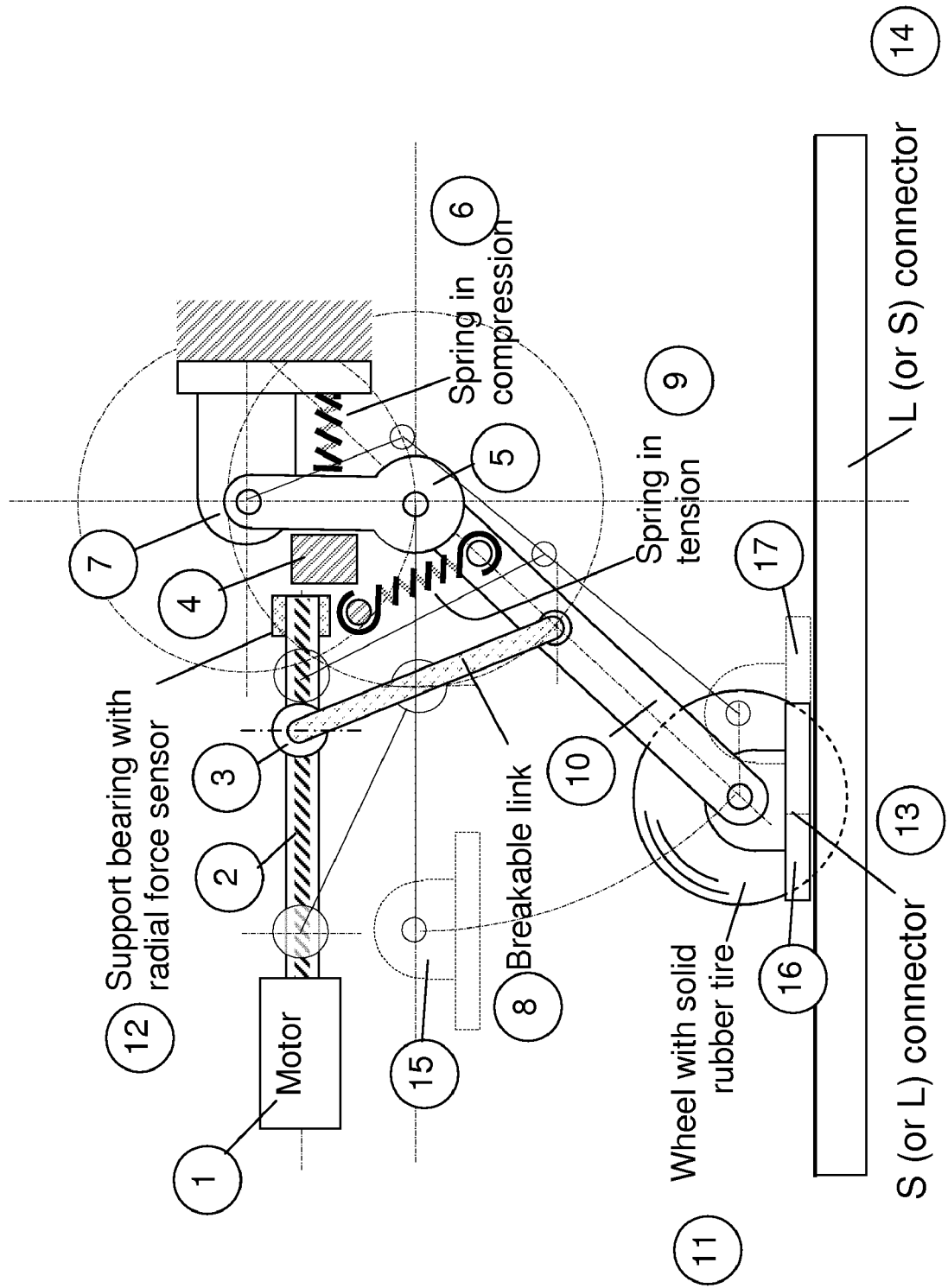
Figure 6: Actuating Mechanism.

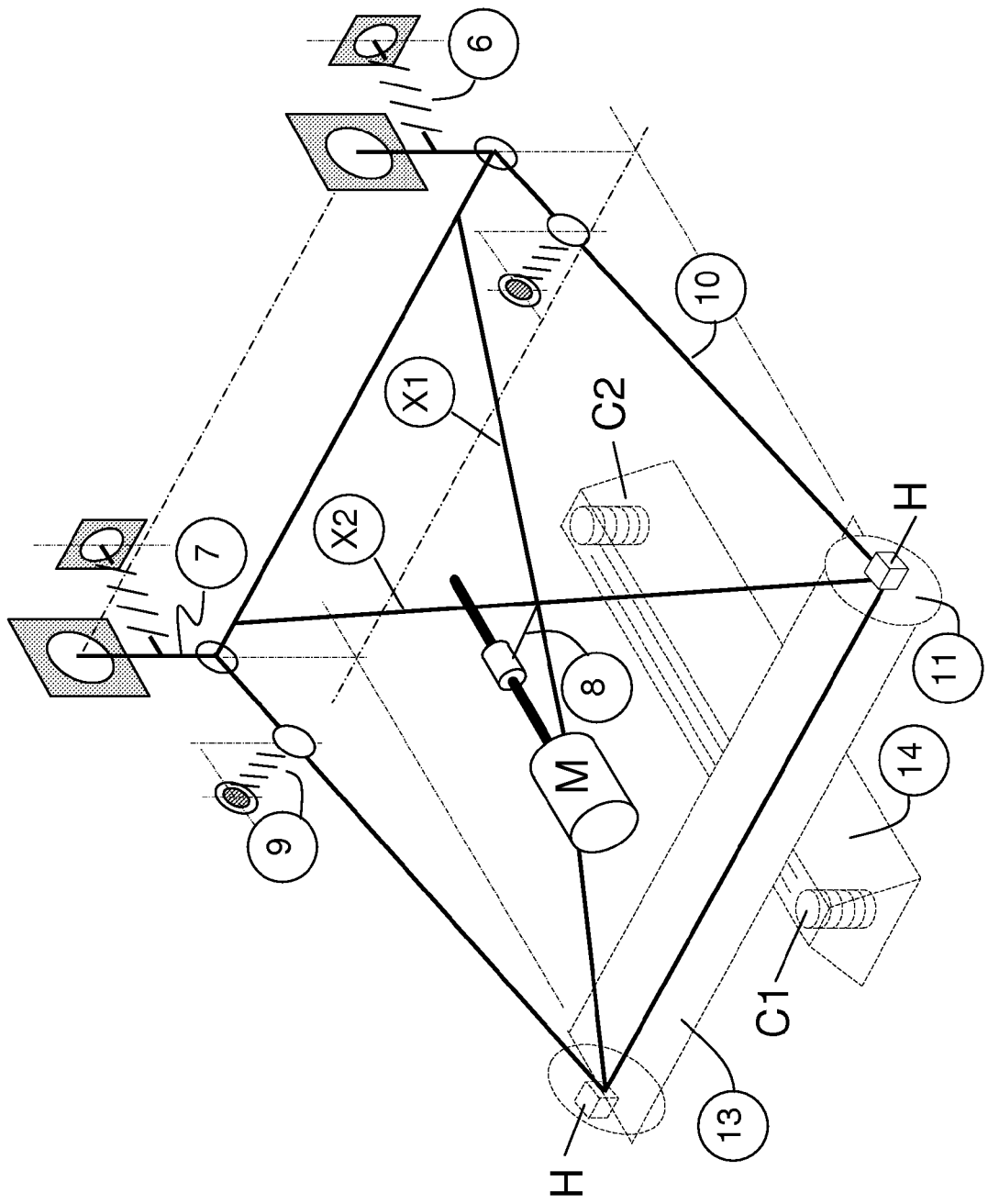
Figure 7: Mechanical system: Configuration 1.

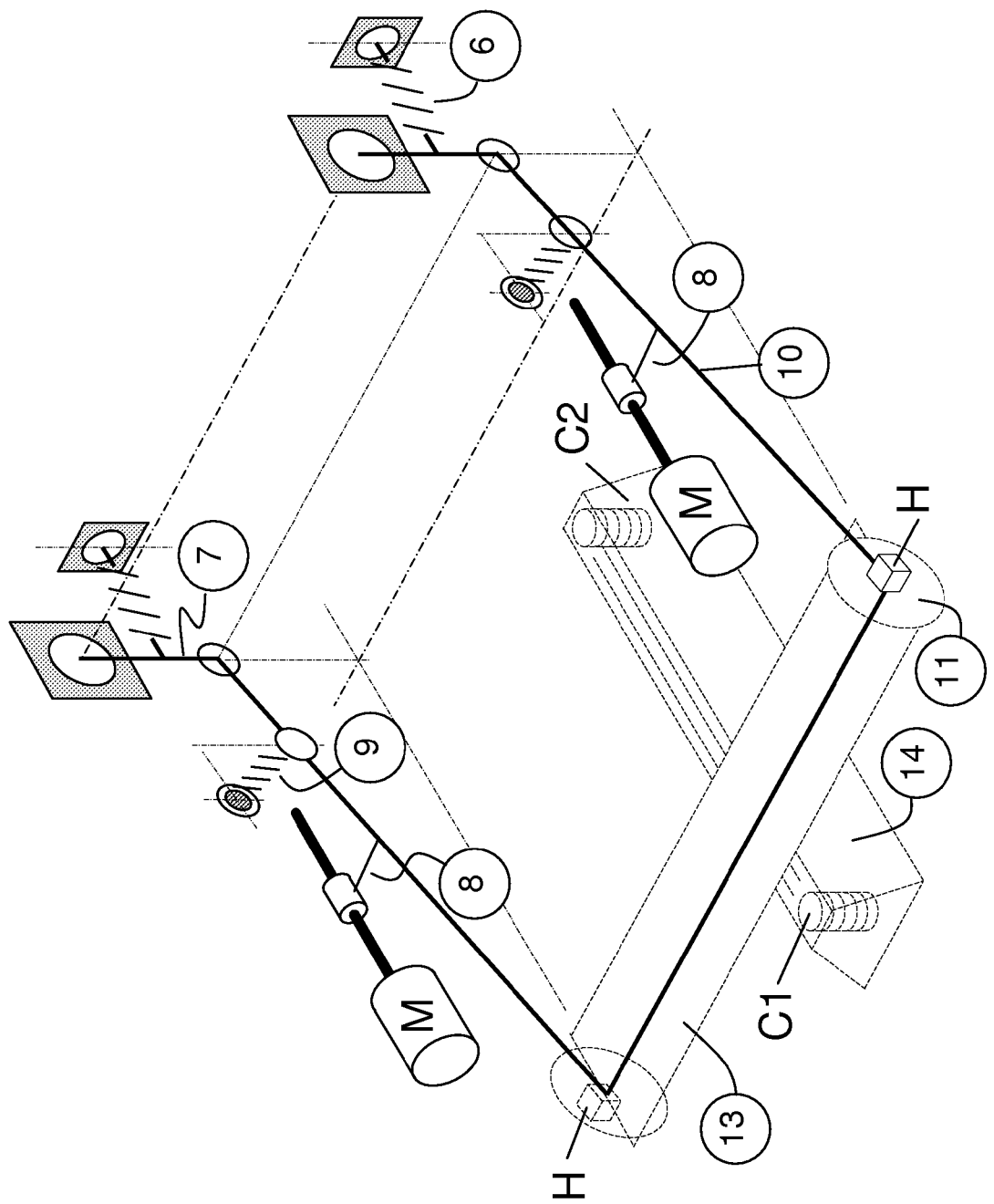
Figure 8: Mechanical system: Configuration 2.

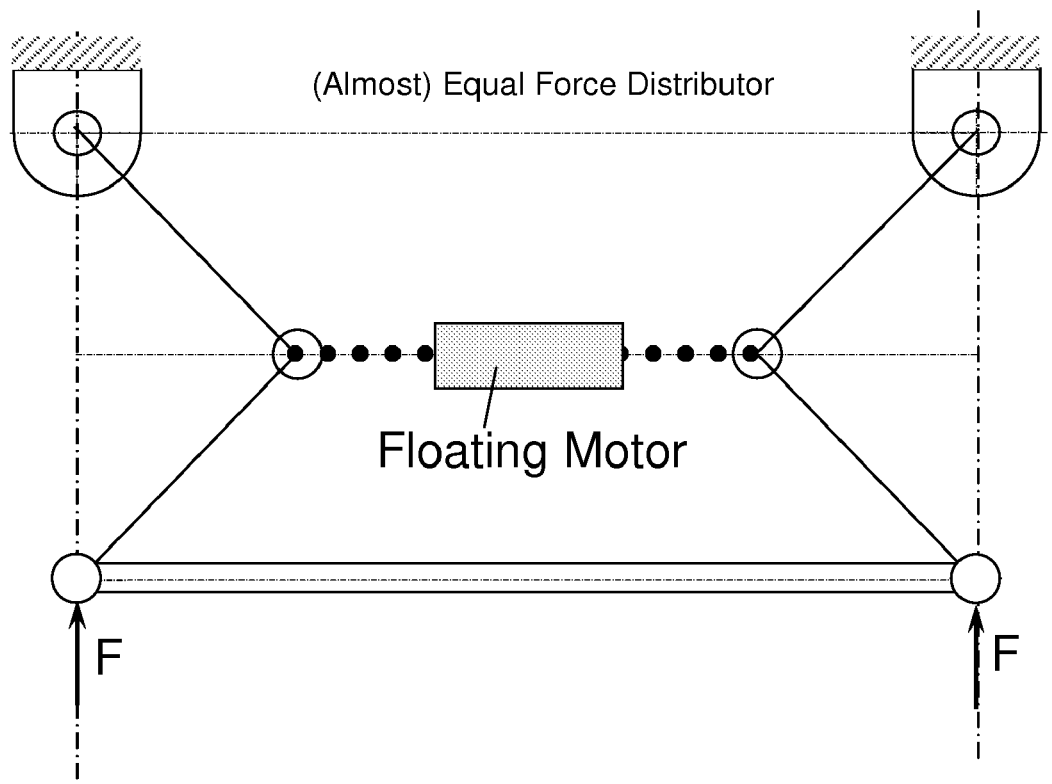
Figure 9: Equal force distributor replacement mechanism for link 10.
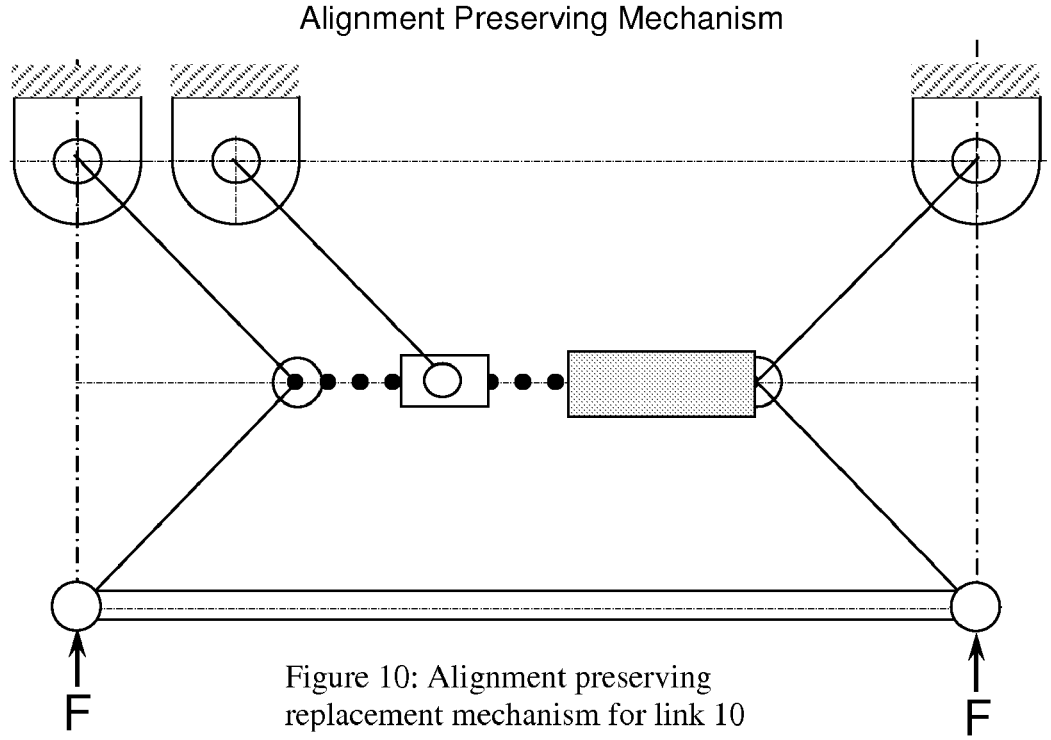
Figure 10: Alignment preserving replacement mechanism for link 10

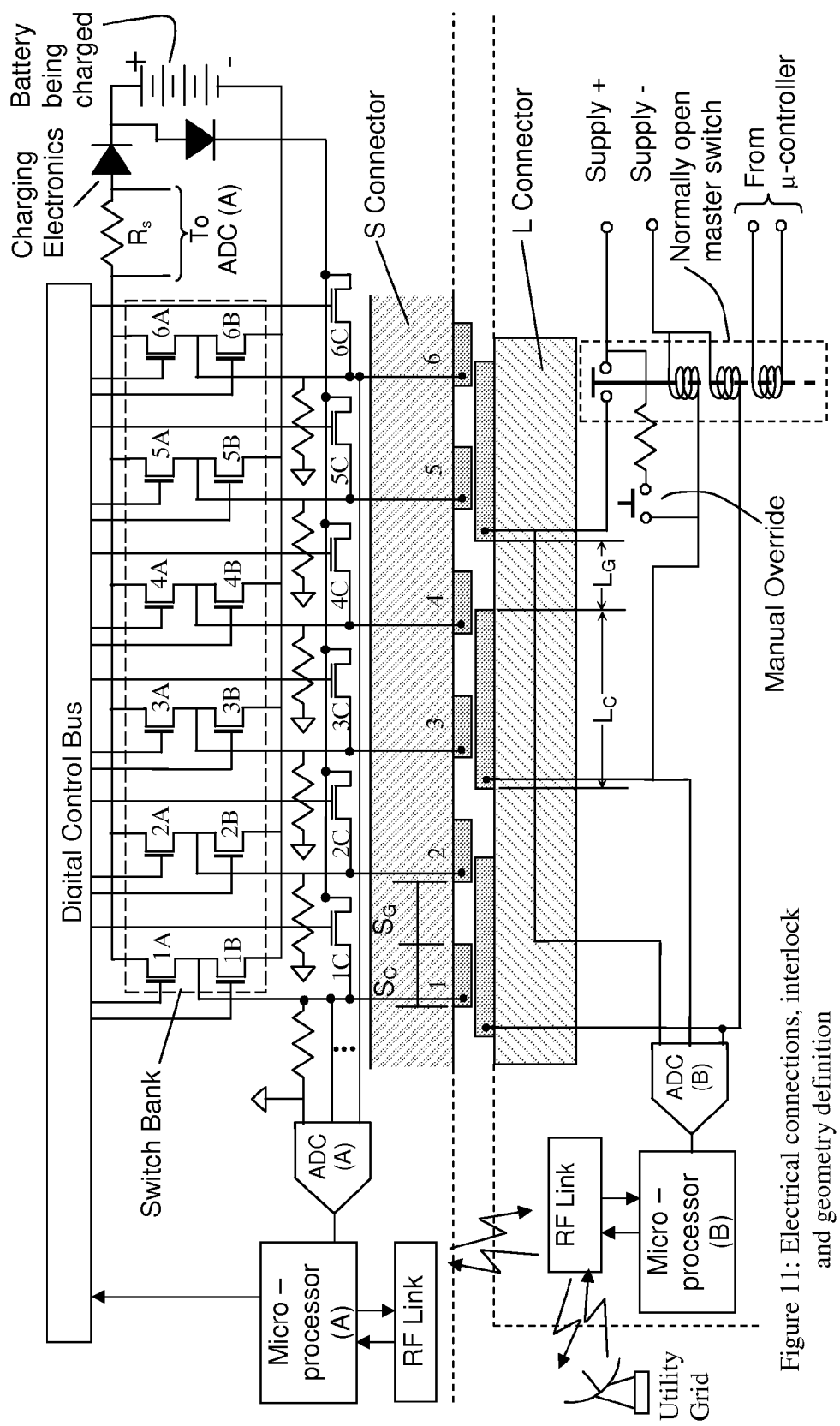
Figure 11: Electrical connections, interlock and geometry definition

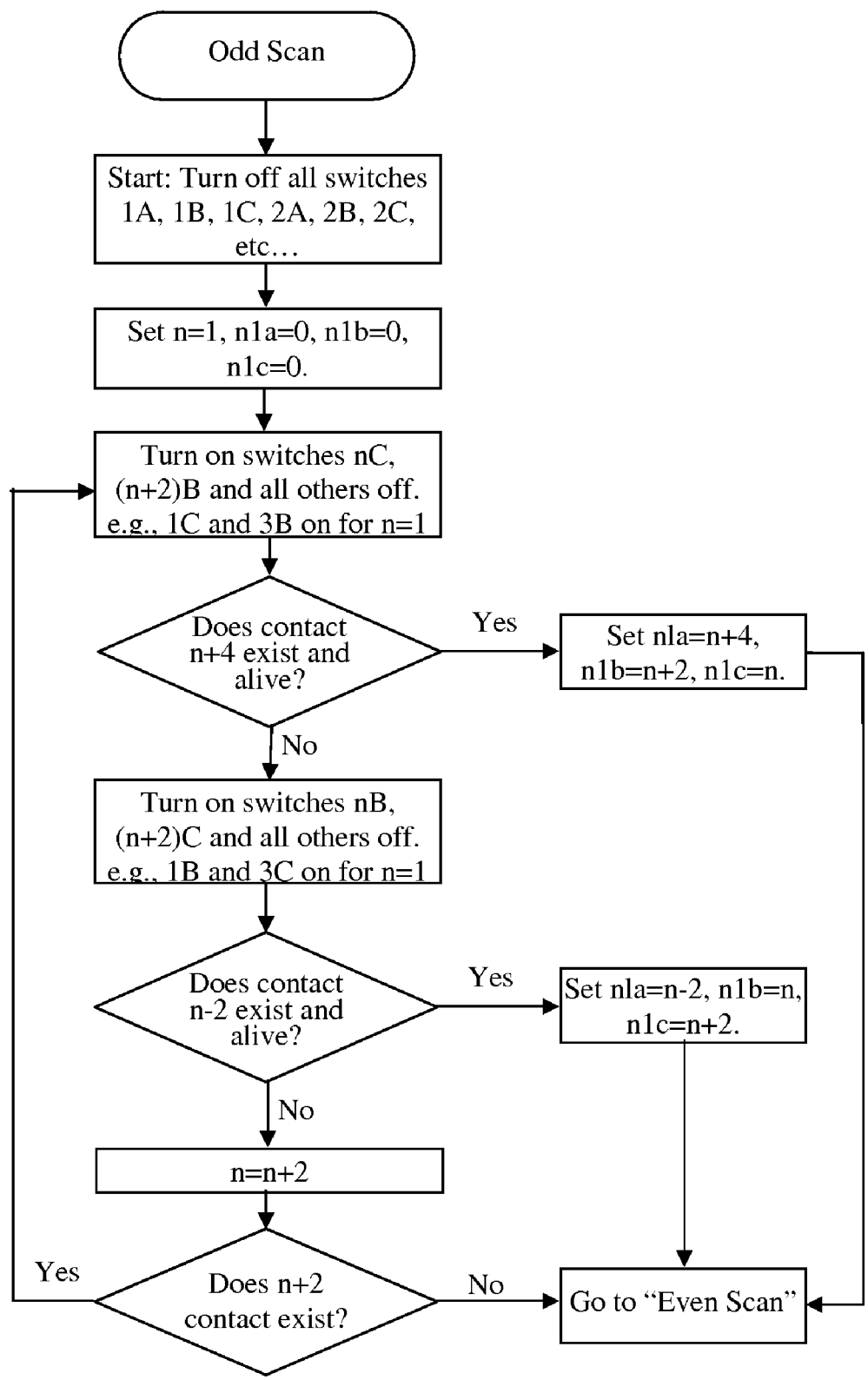
Figure 12: Steps to select contacting conductors, executing on microprocessor A.

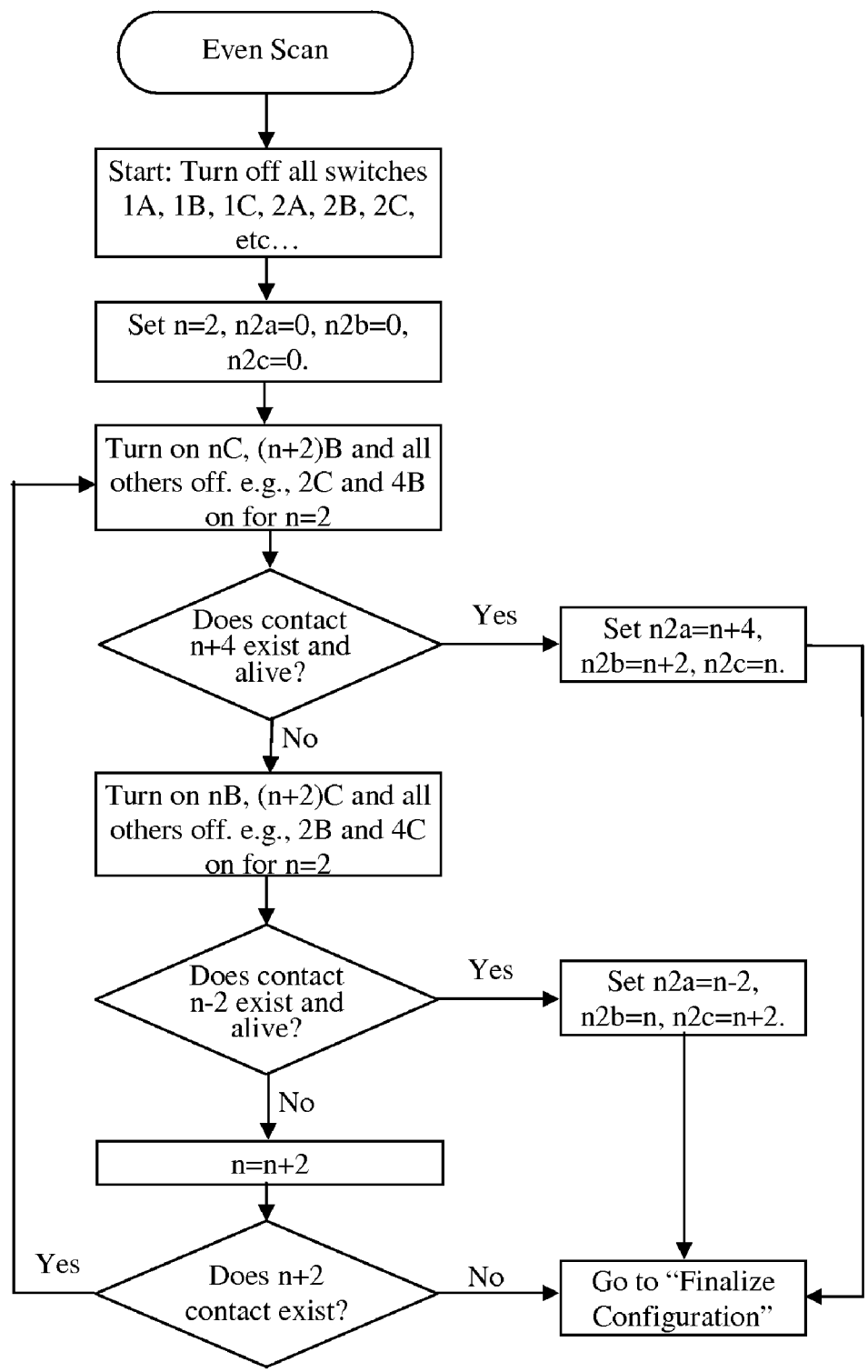
Figure 13 Steps to select contacting conductors, executing on microprocessor A.

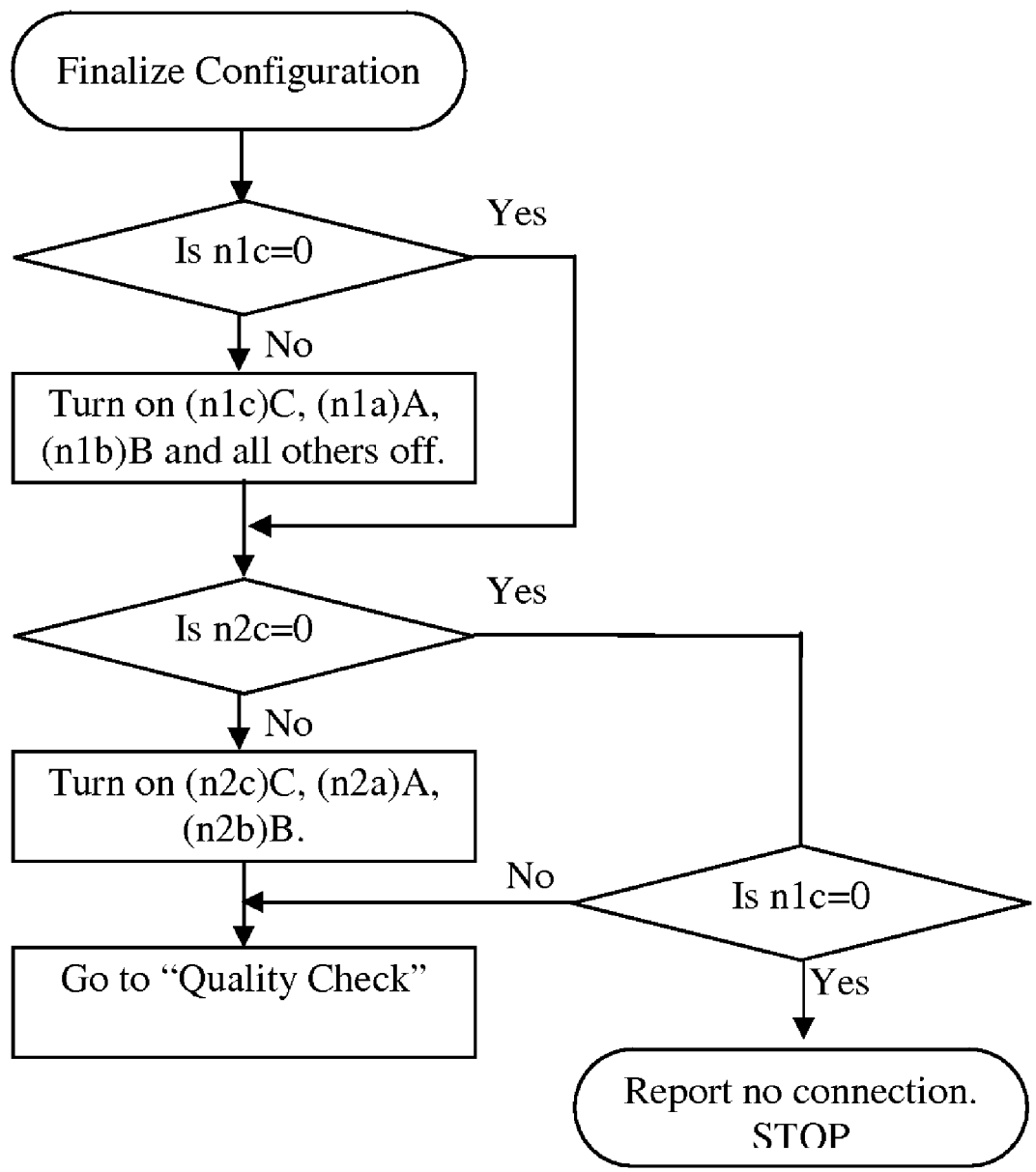
Figure 14 Steps to select contacting conductors, executing on microprocessor A.

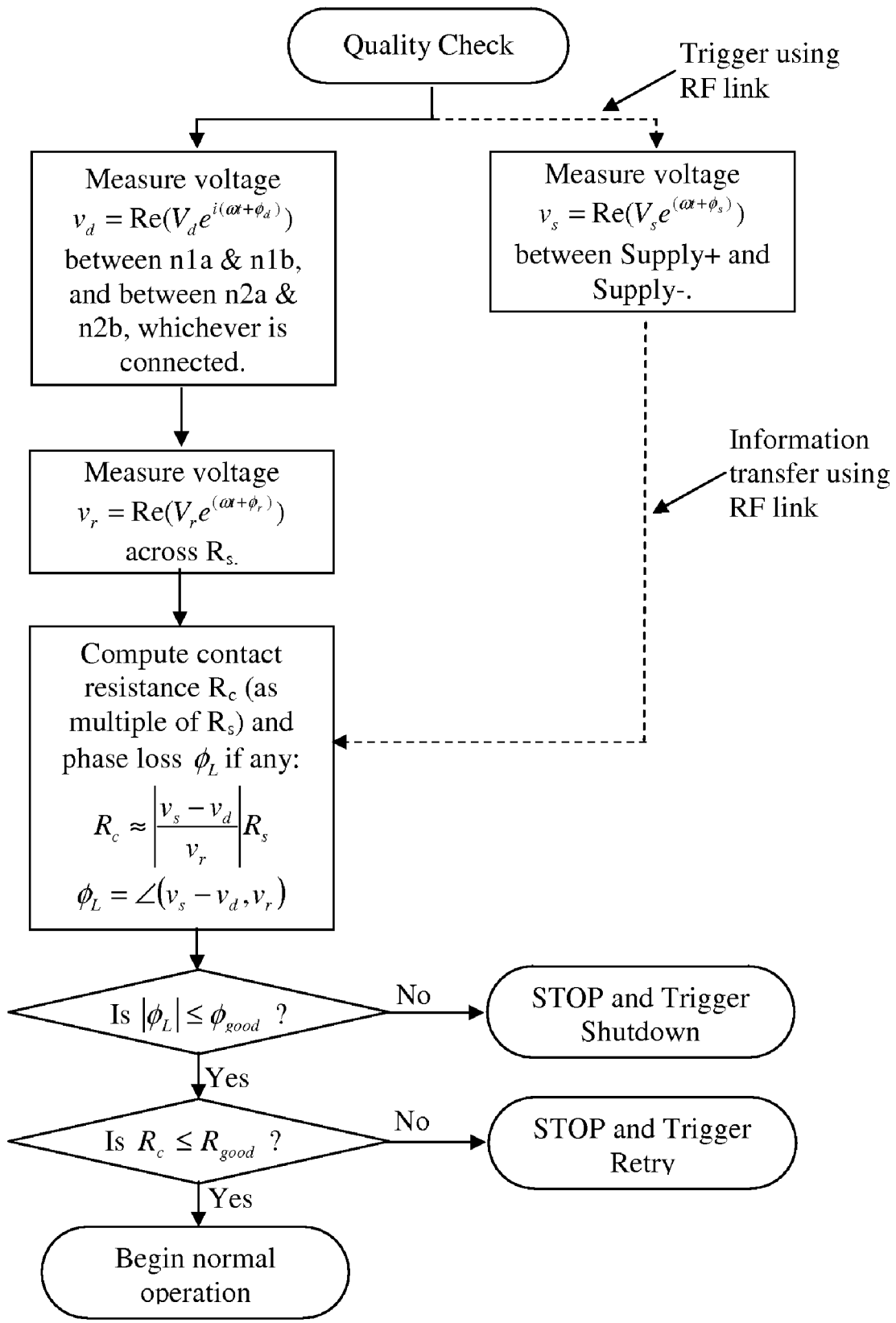
Figure 15: Connection quality check.

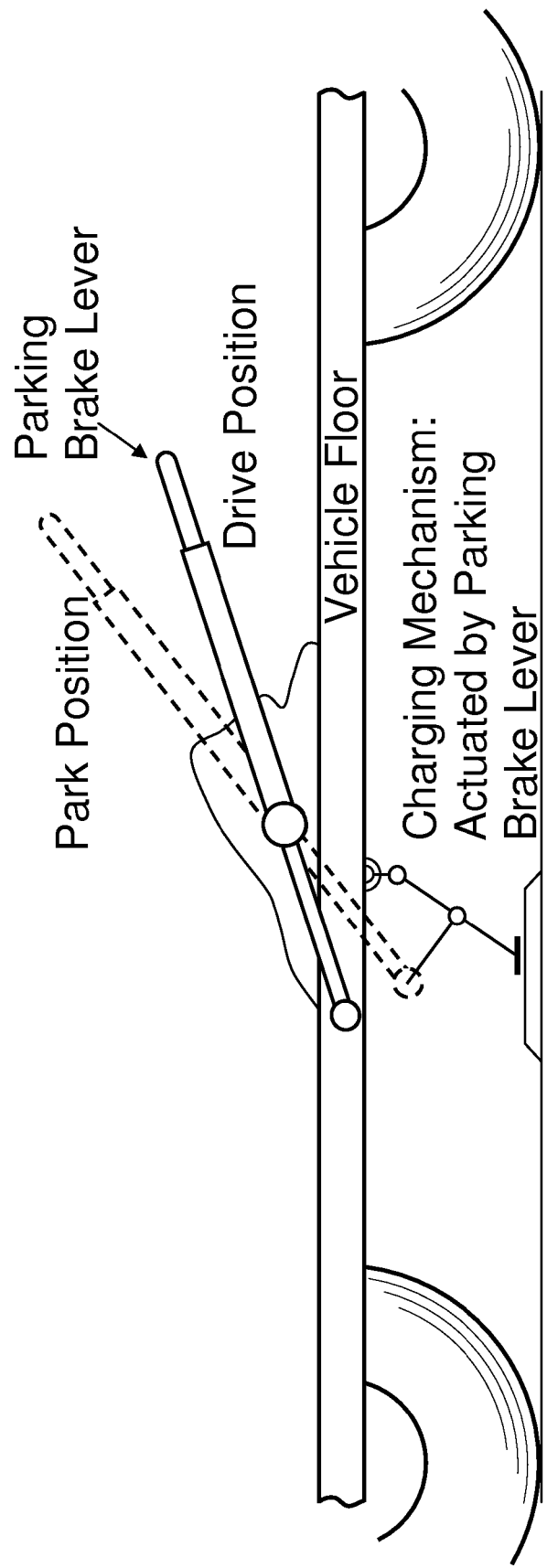
Figure 16: Using parking brake or similar lever for charging mechanism actuation.

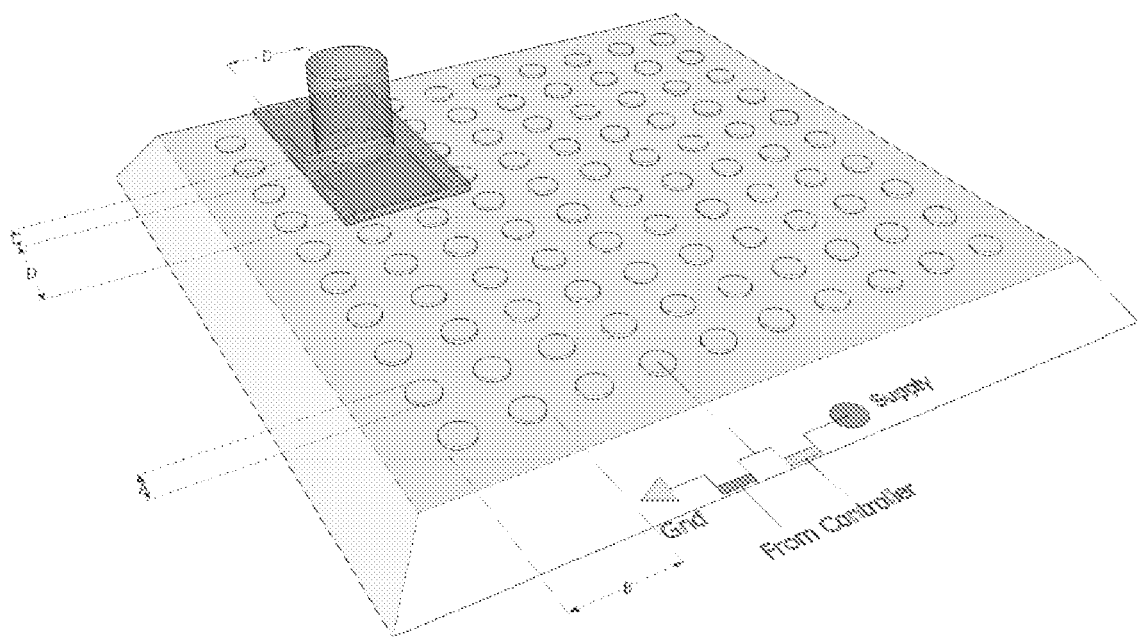
Figure 17: L and S connector (Grid style)

WIDELY DEPLOYABLE CHARGING SYSTEM FOR VEHICLES

CROSS-REFERENCE TO RELATED APPLICATIONS

This application claims priority over U.S. Provisional Patent Application 60/947,954, filed Jul. 4, 2007, titled "Widely deployable charging system for vehicles", which is incorporated herein by reference in its entirety.

DESCRIPTION OF DRAWINGS

FIG. 1: L and S connectors.
FIG. 2: Electrical connections and geometry definition.
FIG. 3: Splitting the L-connector conductors.
FIG. 4: Front underside mounting.
FIG. 5: Underside mounting.
FIG. 6: Actuating Mechanism.
FIG. 7: Mechanical system: Configuration 1.
FIG. 8: Mechanical system: Configuration 2.
FIG. 9: Equal force distributor replacement mechanism for link 10.
FIG. 10: Alignment preserving replacement mechanism for link 10
FIG. 11: Electrical connections, interlock and geometry definition
FIG. 12: Steps to select contacting conductors, executing on microprocessor A.
FIG. 13 Steps to select contacting conductors, executing on microprocessor A.
FIG. 14 Steps to select contacting conductors, executing on microprocessor A.
FIG. 15: Connection quality check.
FIG. 16: Using parking brake or similar lever for charging mechanism actuation.
FIG. 17: L and S connector (Grid style)

BACKGROUND AND PRIOR ART

After reviewing over 150 patents from the class 320.109, class 439.10 and class 439.34, it is deemed that this invention is unique and new over the prior art.

The problem of transferring electrical energy to moving vehicles has received substantial attention in the transportation and material handling community. Consequently there is a rich array of technologies available in the prior art. The prior art can be broadly classified into following categories:

Cable with connectors or pedals: (U.S. Pat. No. 6,185,501) All such systems involve manual connection and disconnection of vehicle to the infrastructure. Apart from the fact that these systems do not offer automation, they do have safety issues arising from a potentially complex tangle of wires to be managed as well as possibilities of accidental drive off by a forgetful driver while the vehicle is still tethered to charging outlet.

Large scale inductive transfer: (U.S. Pat. No. 5,573,090). These systems involve oversized primary induction coils embedded under parking spot. Large dimensions are intended to cover the vehicle parking misalignments. Such systems suffer from the excessive inductive energy wastage and involve complex infrastructure modifications that are unsuitable for modern personal use vehicles.

Overhead pantographs: (RE29,994, U.S. Pat. No. 3,955, 657, U.S. Pat. No. 5,651,434) All such systems are bulky intrusive configurations that need involved installation and maintenance of overhead bus bars. These systems also involve single energy transfer channel due to the cross bars with single conductors. The second connectivity channel is taken from underground connection. This leaves no room for additional channels for energy transfer interlocks, which are crucial from the operational safety viewpoint.

Electromagnetic radiation coupling: (U.S. Pat. No. 7,068, 991, U.S. Pat. No. 6,792,259, U.S. Pat. No. 6,114,834, U.S. Pat. No. 5,982,139) A handful of patents refer to a narrow radiation beam emanating from an infrastructure device and hitting energy receiving devices on the roof of vehicles. Such systems still need a fair amount of manual alignment, but most importantly have very limited energy transfer rates for a safe level of radiation.

Conical/compliant receptacles: (U.S. Pat. No. 7,023,177, U.S. Pat. No. 6,614,204, U.S. Pat. No. 5,850,135, U.S. Pat. No. 5,696,367, U.S. Pat. No. 5,498,948, U.S. Pat. No. 5,272, 431) These systems offer a limited tolerance to vehicle to parking stall misalignments. The operator is still expected to home into the receiving or compliant zone of the receptacle and stop just in time not to push against the infrastructure. In addition to expecting specific behavior from drivers, an accidental poor alignments as well as fast approach pose collision threat and will degraded the operation and reliability of such systems.

Active location seeking robotic arms/trolleys: (U.S. Pat. No. 6,859,010, U.S. Pat. No. 5,821,731, U.S. Pat. No. 5,703, 461, U.S. Pat. No. 5,696,367, U.S. Pat. No. 5,654,621, U.S. Pat. No. 5,646,500, U.S. Pat. No. 5,617,003, U.S. Pat. No. 5,461,298, U.S. Pat. No. 5,272,431) There are many variants of these systems depending on the sensing scheme used as well as actuation schemes used. Such systems are relatively complex and depend on reliability of several sensors and motion control loops. A miss-calibrated/drifted system could pose a spectrum of problems ranging from scratching the shiny paint of vehicle to simply not being able to connect the vehicle. Apart from the intrusive nature of the robotic arms, both the trolleys as well as robotic systems are susceptible to vandalism in open infrastructure applications.

Physical and virtual guiding systems for homing: (U.S. Pat. No. 6,525,510, U.S. Pat. No. 5,850,135, U.S. Pat. No. 5,461, 298, U.S. Pat. No. 5,341,083, U.S. Pat. No. 4,496,896) The first category of these systems either employ mechanical guides for vehicle tires, forcing the vehicle to a relatively precise location for the automatic connector to mate with now precisely located vehicle side counterpart. Some other systems involve passive guidance to the drives, either based on a sensor pair, a dashboard or infrastructure based display device or through grid markings on the pavement. Such systems are either large footprint and tend to be bulky, or are imprecise (passive guidance) and need further connectivity assistance from conical, compliant or active search components.

Contactor arrays: Such systems have multiple connectors placed on infrastructure that will end up connecting with relatively few contactors on the vehicle side and vice versa. The vehicle to parking stall misalignment is compensated by multiple conductors. This patent generally falls in this category of devices. Specifically: U.S. Pat. No. 6,307,347 describes a pair of two dimensional grids, each grid being permanently dedicated for one channel of connectivity. This not only increases the number of connectors (proportional to $l^2$) per channel of connectivity, but also needs each grid big enough to tolerate the vehicle misalignment specs. Thus making the total # of contactors to $n \times l^2$, where n is # of connectivity channels and l is the grid's linear dimension, which has to be bigger than vehicle parking tolerance in one dimension.

U.S. Pat. No. 5,651,434 has two overhead cables and the vehicle has a pantograph with two contactors insulated from each other. Due to the one to one correspondence between the infrastructure side and vehicle side contactors, this arrangement necessitates the two cables as well as the two pantograph connectors be separated laterally by the worst case lateral misalignment specs of the vehicle plus the lateral dimension of the pantograph contactors, making it a bulky system, which is difficult to extend beyond two connectivity channels, a prime safety requirement from ground fault detection viewpoint. U.S. Pat. No. 5,523,666 has features similar to contactor array structures; however it still depends on the mating pair of contactors to be brought together by active positioning. Again the one to one correspondence between the infrastructure and vehicle side connectors means relatively precise alignment at least in one direction, between the corresponding connectors is required. This alignment in the U.S. Pat. No. 5,523,666 is made by active positioning of the infrastructure rails and suffers from the consequent disadvantages of an active positioning system.

U.S. Pat. No. 5,252,078 is very similar to U.S. Pat. No. 5,523,666, except the relatively positioning of the mating connectors is achieved by passive compliant members. Both U.S. Pat. No. 5,252,078 and U.S. Pat. No. 5,523,666 suffer from the disadvantages of a system requiring precise alignment—whether passive or active, as well as carry potential for damage and reduced reliability and safety due to drivers accidentally driving into the system.

U.S. Pat. No. 4,158,802 is an overhead contactor system with one to one contactor correspondence between vehicle and infrastructure. Consequently suffers from either precise positioning or too large contactor spacing and size. As described, this system is also bulky and needs involved installation.

U.S. Pat. No. 4,850,879 is a front bumper variation of U.S. Pat. No. 6,307,347. Both, U.S. Pat. No. 4,850,879 as well as U.S. Pat. No. 6,307,347 describe conductor arrays that have contiguous domains of conductors that are electrically connected to each other and represent one single large conductor. Corresponding to one conductor (or a group of conductors that are electrically connected to each other) on ground, there is one and only one conductor on the vehicle that the ground conductor is permitted to pair with. All inventions based on one to one conductor pairing necessitate large individual conductors (or group of conductors) or accurate positioning. In case of U.S. Pat. No. 4,850,879, former is true. Additionally, U.S. Pat. No. 4,850,879 can be damaged due to accidental driving in.

DETAILED DESCRIPTION OF THE INVENTION

A mechanical, electrical and telecommunication arrangement to transfer electrical energy to a vehicle is described in this invention. At the core of the system (see FIG. 1) is a pair of linear arrays of conductive elements insulated from each other. A specific rendition where one of the arrays is a 1×7 array (labeled as S-Connector) and the other is a 2×1 labeled L connector is shown in the FIG. 1. One of the connectors (either S or L connector) is placed on the infrastructure side and the other on a vehicle. When the array on the vehicle is in the proximity of the array on the ground, such that the two have an overlap, one or both of the arrays are moved towards each other. This causes the array elements—labeled as "conductors", to mate and form an electrical contact in the overlap region. Depending on the relative position of the vehicle in the parking stall, an arbitrary group of conductors from S connector may come in contact with an equally arbitrary group of conductors from L-connector. A series of switches connected to each of the contactors, in cooperation with a microprocessor select the contactors in the overlap region for use in the energy transfer process. Notice that the lengths of the array and their relative orientation to each other allows for a tolerance in the accuracy of parking a vehicle. In fact the length of each of the S and L connectors is the amount of allowable parking tolerance in lateral and longitudinal direction, and is a direct design variable to cover the parking inaccuracies in the respective directions. The following paragraph describes further design procedure to ensure realiable contact between the elements of two arrays upon contacting each other. In the description, it is assumed that the intention is to establish two electrical conductive paths between array "S connector" and array "L connector". These will be referred to as + and − paths. In this example shown in FIG. 1, one of the conductors on the "L conductor" has polarity − and the other has polarity + in terms it electrical potential.

In order to ensure a guaranteed contact of correct polarity, the geometry of the conductors on the S and L connectors has to follow certain geometric constraints. Assuming the conductor dimensions are as shown in FIG. 2, the constraints are:

| 1 | $S_C + S_G < L_C$ | Ensures that a L conductor contacts at least one S conductor fully. |
|---|---|---|
| 2 | $S_C < L_G$ | Ensures that S conductor does not short neighboring L conductors. |
| 3 | $S_C + 2S_G > L_C$ | Ensures that L conductor does not short 3 neighboring S conductors. |
| 4 | $2S_C + 2S_G = L_C + L_G$ | Ensures that + and − connections end up with same geometry. |

Note that one solution to these constraints is: $S_G = S_C$, $L_C = (3 − x) S_C$, $L_G = (1 + x) S_C$, where x is number between 0 and 1.

Once the connectors are brought to mate with each other, a microprocessor reads the potential on each of the S-connector conductors (see FIG. 2). Using these measurements, the microprocessor can figure out the specific conductors on the S-connector that have mated with conductors on L connector as well as their polarity. In turn the microprocessor switches on the appropriate MSOFETs from the Switch Bank, to ensure correct electrical polarity to appear at the Load + and Load − terminals in FIG. 2.

As a further safety modification, the conductors on the L-connector can be divided into smaller pieces as shown in FIG. 3. Once the contact is made, a switching bank (not shown) similar to the one shown in FIG. 2, is used to power up only the mating L-connector conductors. This ensures that unused and possibly exposed L-connector conductors carry no electrical potential. This improves safety and eliminates accidental short circuits.

It should be noted that the voltages used across the mating connectors can be any low voltages such as 12 or 24V. Electronic pre and post processing will be used to down and up convert the low interface voltages to any desired input/output voltages. This is to further enhance safety and reduce operational hazard.

There are several locations on the vehicle for mounting the movable connector (either S or L). FIG. 4 and FIG. 5 show two such examples. Both of these examples show the infrastructure side connector mounted on the pavement. One can think of many alternate locations and mechanisms with or without pavement mount.

Among other alternatives is a configuration with roadside connector mounted on an actuator and vehicle side connector being mounted rigidly on the vehicle.

The motion involved to mate the connectors, is a simple one dimensional motion and can be accomplished by many different mechanical arrangements. FIG. 6 shows an actuating mechanism to mate the two connectors. Specifically, the motor 1—mounted on vehicle actuates a feed screw 2. The other end of the feed screw is mounted on bearings 12, which is also attached to the vehicle. This bearing can sense the vertical bearing force. The link 8 is connected to the feed screw 2 by a feed nut 3. The link 8 further connects up with link 10 with a pin. One end of link 10 is pivoted on link 5 and the other end carries a solid rubber tire 11 and one of the connectors—either S or L. The link 5 is pivoted to vehicle using member 7. The tension spring 9 is anchored to vehicle at one end exerts an upward pull on the member 10 by being in tension at the position shown. The compression spring 6 normally pushes member 5 against the stop 4. The stop 4 is attached to the vehicle. The mechanism stays in its retracted position 15 when the vehicle is in motion. After the vehicle is parked and ready for charge, a microprocessor runs the motor 1 and first brings the mechanism in to position 16 in which the connector 13 (S or L) just touches the connector 14 (L or S). During this motion, the link 5 continues to be pushed by spring 6 against stop 4. The motor 1 then moves further and the connector 13 moves from position 16 to 17. During this motion, the link 5 moves against the spring 6. The motor continues to push till a certain force is measured at the bearings 12. The bearing force sensor is optional. Same information can be sensed by monitoring the motor current. The last part of the motion from position 16 to 17 causes the conductors to slide against each other with a sizable interface force, thus ensuring a good quality contact by cleaning the debris and any oxide film that may have formed.

In the case when the mechanism in FIG. 6 is in its extended position (i.e. connector 13 in position 17), and a passenger enters the vehicle, thus compressing the vehicle suspension springs by a few inches. Such motion will be well tolerated by the mechanism in FIG. 6 by further compressing the spring 6. The allowable stroke of the spring 6 should be designed appropriately to accommodate the vehicle suspension compliance.

The mechanism is able to operate with a wide range of initial separation between connector 13 and 14. The link 10 will extend till it encounters the reaction from the conductor 14. At that point—independent of the angular deployment of link 10, the conductots will start sliding against spring 6.

The overall mechanical system can be configured in many ways. Two examples are shown in FIG. 7 and FIG. 8. The Configuration #1 (FIG. 7) uses only one motor for actuation and exerts almost equal forces on the two (right and left) copies of the link 10. The Configuration #2 (FIG. 8) uses two independent copies of the actuating mechanism. After the connectors 13 and 14 have made their initial contact, the location (along the connector 13) of the contact point will be sensed through a capacitive proximity sensor (not shown) and appropriate forces are applied to the two copies of the link 10, such that the moments of these forces are balanced about the contact point. The force computations being done by the microprocessor after the contact point sensing. Alternatively the two forces will be applied such that the connector 13 swings through some small positive and negative angle, while monitoring the quality of the connection using a small dummy potential applied to the connector 14. Once a good quality connection is sensed, the force proportion on the two actuators will be frozen for subsequent motion.

FIG. 7 and FIG. 8 also show energized coils (or permanent magnets) C1, C2 and magnetometers H. The magnetic field emanating from energized coils (or magnets) C1 and C2 will be sensed by magnetometer H. The sensed magnetic field will be converted to relative position between connector 14 and 13. This information will be provided to user via a user interface. This information will be used as an optional feedback to the user during parking. Depending on the specific design, the magnetic field from C1 and C2, as sensed by the magnetometers H, will be distinguished by polarity or timing.

Fail safe features: In the normal circumstances, an electronic interlocking with the ignition key of the vehicle will be employed to ensure that the mechanism is fully retracted before the vehicle starts to move. However, in case of malfunction, there are two level fail safe features incorporated in the mechanism. The first feature is the soft rubber wheel 11, which will smoothly rotate upon touching the road, thus causing no harm to the drivability of the vehicle. In case the mechanism is stuck in a position such that a large portion of road forces are being borne by the rubber tire 11, the second feature kicks in. The breakable link 8 will break up under the road forces that are transmitted to it via wheel 11 and link 10. Once broken, the spring 9 will pull the linkage 10 up to its retracted position or close to it. Alternatively, the pin connecting the link 8 and lead nut 3 can be a breakable link to achieve a similar fault protection.

In an alternative mechanism, the motor 1, the feed screw 2 and the feed nut 3 will be eliminated. The link 8 will be replaced by mechanisms such as shown in FIG. 9 and FIG. 10. The mechanism in FIG. 9 is an equal force distribution mechanism in which the two copies of the link 10 will be pushed down with almost equal force. The mechanism in FIG. 10 is an alignment preserving mechanism in which the connector 13 will be kept parallel to its original position.

In an alternative mechanism, the motor 1, the feed screw 2 and feed nut 3 will be replaced by a pneumatic cylinder. Further the air supply can be centrally or locally heated. The heated air will be intentionally leaked out of the pneumatic cylinder periodically to melt away any accumulated snow or frozen moisture in cold weather. The periodic hot air bursts will also help clear away any normal debris that may have accumulated on the actuating mechanism. As an additional cold weather protection, optional heating elements can be embedded in the conducting arrays to ensure all surface moisture is melted away.

Once the mechanical motion is completed, the contactor selection process begins. One example of such algorithm is presented in FIG. 12, FIG. 13 and FIG. 14. This is followed by a connection quality check described in FIG. 15. Finally a communication with the utility grid is established to optimize charging process parameters, such as rate and time of charging to realize cheapest energy costs or any other goal set by the user. Specific details of such transaction are not intended to be part of this invention.

Some of the additional features for reliability improvement are:

1. A set of wipers on the leading edge of the connector 13, arranged such that they end up wiping the relevant portion of the connector 14 as the two connectors approach during mating.
2. A dust cover to cover the retracted position of the connector 13 and its moving linkage.
3. A circuit design to ensure that the exposed conductors of connector 13 and 14 are kept at a negative potential, so that they get protected from degrading by the cathodic protection.
4. A circuit design to ensure that the vehicle tires are kept at a negative potential, so that they get protected from degrading by the cathodic protection.

Unique Features of the Invention and their Market Value

1. No need for precise vehicle positioning. Normal parking accuracy using the usual painted parking stall markings will be sufficient to make a successful contact.
2. Static and movable parts of the connector are configurable. In one configuration, static connector is on the infrastructure side, enabling wide scale deployment. In other configuration, the static connector is on the vehicle, minimizing changes required on the vehicle.
3. No tangle of wires or mechanical arms emanating to/from a group of vehicles being charged.
4. Self cleaning of the contact surfaces by sliding motion across each other before the electrical potential is established. This ensures high quality of contact.
5. Elimination of sparking by a microprocessor that switches on the electrical potential only after ensuring that a quality connection has been established.
6. Low voltage across interfacing conductors ensuring human safety.
7. Only relevant conductors are turned on after ensuring a good contact using a small dummy voltage to test the connection quality. This keeps the conductors normally de-energized to further reduce human hazard.
8. Individually switched multiple conductors enable pin-pointed energizing of relevant conductors for safe operation and shutdown during detected short circuits from accidental nails or other metal debris landing on the conductor. The energized section of the connector will always be first swept for debris and then covered by the mating connector.

The invention claimed is:

1. An apparatus which electrically connects a first group of electric terminals on a first object to a second group of electric terminals on a second object comprising:
    a first array of one or more conductive elements, each electrically connected to one of the members of the first group of electric terminals;
    a second array of one or more conductive elements, each connected by a first group of electrical switches to each member of the second group of electric terminals; and
    an actuating mechanism which is attached to the first array of conductive elements and contacts the first array of conductive elements with the second array of conductive elements or is attached to the second array of conductive elements and contacts the second array of conductive elements with the first array of conductive elements.

2. The apparatus of claim 1, further comprising of a microprocessor connected to each of the electrical switches from the first set of electrical switches that are connected to second array, which can determine the potential of the conductive elements of the second array and activate the first set of electrical switches.

3. The apparatus of claim 1, wherein the actuating mechanism moves the conductive elements from the first and the second array with respect to each other after the two arrays are contacted.

4. The apparatus of claim 1, wherein the actuating mechanism maintains constant contact between the first and second array of conductive elements when the first and the second object are moved with respect to each other.

5. The apparatus of claim 1, wherein the first object is a surface and the second object is a transportation vehicle.

6. The apparatus of claim 1, wherein electric heating coils are embedded in the first array and the second array.

7. The apparatus of claim 1, wherein heated air from a pneumatic cylinder in the actuating mechanism is passed over the first array and the second array to melt any accumulated snow or frozen moisture.

8. The apparatus of claim 1, wherein at least one of the conductive elements of the first array is replaced by two or more conductive elements whose individual members are connected by a second set of electrical switches to one of the conductive elements of the first group of electric terminals.

9. The apparatus of claim 1, wherein the number of electric terminals in the first group and the number of electric terminals in the second group are 3.

10. The apparatus of claim 9, wherein:
    a first electric terminal from the first group of electric terminals is connected to an electrical supply line from a power source with an electrical switch with a first electrical control terminal;
    a second electric terminal from the first group of electric terminals is connected to a neutral line from the power source;
    a third electric terminal from the first group of electric terminals is connected to the first electrical control terminal of the electrical switch of the first electric terminal; and
    one of the electric terminals from the second group of electric terminals is connected to a second power source.

11. The apparatus of claim 10, further comprising of a microprocessor connected to each of the electrical switches from the first set of electrical switches that are connected to second array, which can determine the potential of the conductive elements of the second array and activate the first set of electrical switches.

12. The apparatus of claim 10, wherein at least one of the conductive elements of the first array is replaced by two or more conductive elements whose individual members are connected by a second set of electrical switches to one of the conductive elements of the first group of electric terminals.

13. The apparatus of claim 10, wherein the first object is a surface and the second object is a transportation vehicle.

14. The apparatus of claim 10, wherein electric heating coils are embedded in the first array and the second array.

15. The apparatus of claim 10, wherein heated air from a pneumatic cylinder in the actuating mechanism is passed over the first array and the second array to melt any accumulated snow or frozen moisture.

16. The apparatus of claim 10, wherein the first array and the second array are aligned in an approximately perpendicular arrangement.

17. The apparatus of claim 10, wherein the actuating mechanism moves the conductive elements from the first and the second array with respect to each other after the two arrays are contacted.

18. The apparatus of claim 1, in which the length of the conductive elements in the first array is $S_C$ and the space between the conductive elements in the first array is $S_G$ and the length of the conductive elements in the second array is $L_C$ and the space between the conductive elements in the second array is $L_G$ wherein: $S_C+S_G<L_C$; $S_C<L_G$; $S_C+2S_G>L_C$; and $2S_C+2S_G=L_C+L_G$.

19. The apparatus of claim 18, wherein $S_C=S_G$; $L_C=(3-x)S_C$; $L_G=(1+x)S_C$; and $0<x<1$.

20. The apparatus of claim 18, wherein:
    a first electric terminal from the first group of electric terminals is connected to an electrical supply line from a power source with an electrical switch with a first electrical control terminal;

a second electric terminal from the first group of electric terminals is connected to a neutral line from the power source;

a third electric terminal from the first group of electric terminals is connected to the first electrical control terminal of the electrical switch of the first electric terminal; and one of the electric terminals from the second group of electric terminals is connected to a second power source.

21. The apparatus of claim 20, further comprising of a microprocessor connected to each of the electrical switches from the first set of electrical switches that are connected to second array, which can determine the potential of the conductive elements of the second array and activate the first set of electrical switches.

22. The apparatus of claim 20, wherein at least one of the conductive elements of the first array is replaced by two or more conductive elements whose individual members are connected by a second set of electrical switches to one of the conductive elements of the first group of electric terminals.

23. The apparatus of claim 20, wherein the first object is a surface and the second object is a transportation vehicle.

24. The apparatus of claim 20, wherein electric heating coils are embedded in the first array and the second array.

25. The apparatus of claim 20, wherein heated air from a pneumatic cylinder in the actuating mechanism is passed over the first array and the second array to melt any accumulated snow or frozen moisture.

26. The apparatus of claim 20, wherein the first array and the second array are aligned in an approximately perpendicular arrangement.

* * * * *